UNITED STATES PATENT OFFICE.

THOMAS SPENCER, OF PHILADELPHIA, PENNSYLVANIA, ASSIGNOR, BY MESNE ASSIGNMENTS, TO NATIONAL CARBON COMPANY, INC., OF CLEVELAND, OHIO, A CORPORATION OF NEW YORK.

STORAGE-BATTERY ELECTRODE.

1,260,472.   Specification of Letters Patent.   Patented Mar. 26, 1918.

No Drawing.   Application filed August 21, 1915. Serial No. 46,665.

*To all whom it may concern:*

Be it known that I, THOMAS SPENCER, a citizen of the United States, residing at Philadelphia, in the county of Philadelphia and State of Pennsylvania, have invented a certain new and useful Improvement in Storage-Battery Electrodes, of which the following is a full, clear, and exact description.

My invention relates to electrodes for storage batteries and more particularly to means for retaining the active material in storage battery plates or electrodes.

A great deal of trouble has been experienced with storage batteries on account of the electrodes disintegrating and prematurely ending the life of the battery. This is particularly true of the positive plate of the battery, though negative plates sometimes act in the same way. The falling off of the paste is of course very objectionable, as it not only diminishes the amount of active material on the electrode, but also tends to short circuit the electrodes. One object of my invention is to construct an electrode in such a way that it will stand rigorous service without thus shedding its paste. Other objects will appear in the appended description.

In storage battery practice it has been the usual process to mix red lead with a certain amount of ammonium sulfate and litharge, and then to paste the mixture into the grid. The litharge and ammonium sulfate forms a binding material for the red lead and holds it in place in the grid. This binding material however, is not sufficient in its action to entirely prevent the shedding of the paste when the battery is in use. I omit the ammonium sulfate and litharge in making my positive plate and use instead of it a condensation product of carbolic acid and formaldehyde, which is known under different trade names, such a "bakelite," "condensite" and "phenol rosin." Before explaining my improvement in detail, a general description of the character and properties of such condensation product will be given.

The condensation product referred to seems to have the property of existing in three definite forms, in which it has different characteristics. In the first stage the material is in a raw condition and will dissolve readily in the usual solvents for rosin. The solid form in this stage becomes soft on heating and is acted on by acids. If the condensation product is heated somewhere in the neighborhood of 200° F. it will be changed over into the second stage where it is more resistant to acids and other chemicals and is insoluble. In this second stage however, it will soften under a still higher heat if pressure is applied. By heating the product in the second stage above a temperature of about 284° F. under a pressure of 100 to 200 pounds per square inch, the product is changed over into the third and final state. Increase in the temperature seems to shorten the time that is required to bring the material into the final state, so it is advantageous to use a higher temperature than 284°. A higher pressure than that mentioned can of course be used as any pressure above the lower limit would have the desired effect.

While the three stages have been described, it must be understood that the condensation product can be carried from the first stage directly to the third stage by using the necessary temperature and pressure.

In making positive plates in accordance with my process, I mix red lead with sufficient amounts of powdered phenolic condensation product to form the right sort of a binder, and no definite proportions are essential. In plates that I have made I have gotten good results by mixing from 6% to 10% of the product with 94% to 90% of red lead. The most suitable proportion seems to be 7% of the product and 93% of red lead, though other proportions may be used if desired. It must be understood that there is no chemical reaction between the red lead and the condensation product, and hence definite proportions are not required. Enough of the product must be used to form the binder to produce the desired kind of electrode, and this will be governed somewhat by circumstances.

The mixture of condensation product and red lead, or other oxid or salt of lead, is placed in a suitable mold with a lead grid which is to act as a support for the active material. After this is done the mold is placed between heated plates in a hydraulic or other press and is subjected to a heavy pressure. It is kept in the press until the combination of heat and pressure has carried the binding material to the final state previously referred to.

In making plates I use the condensation product in either the first or second stage and heat the pasted plates to about 300° F., using about 600 pounds pressure per square inch. Under these conditions the condensation product is transferred over into its final state in about five minutes. When substantially this length of time has elapsed the plates can be removed from the press and they will be found to be quite hard and made up of a spongy structure of binding material filled with the red lead.

The electrodes, after being thus treated, are put through the usual forming process to convert the red lead into lead peroxid, and the plate is ready for use as the positive electrode of the storage battery.

Positive electrodes made in accordance with the foregoing process stand up under rigorous service and do not shed the active material. The resistance and other characteristics of the grid however, seem to be substantially the same as when the usual binder is employed, so that there is a distinct advantage and no disadvantage in the employment of the new binder.

My invention would ordinarily be used in positive plates as such are the ones that usually cause trouble by disintegration. However, the condensation product could equally as well be used in negative plates if so desired. In such case the condensation product would be mixed with the customary form of oxid or even spongy lead.

It must also be understood that the invention is not limited to the use of the new binder with red lead, as it can be mixed directly with lead peroxid and the forming process would then be unnecessary. I have found that the binder works equally as well with both forms of the oxid; in fact the binder could be used with any active material whatever, as there is no chemical interaction between it and the active material, the whole function of the condensation product being to hold the active material in place regardless of its nature.

It has heretofore been proposed to use liquid binders capable of changing into solid form on application of heat, but the liquid binders necessarily coat the lead material thoroughly and when the liquid sets such material is effectually surrounded by the nonconducting binder. Therefore all such forms of binders have been failures, at least as far as I am aware. My process, on the other hand, employs powdered binding material capable of changing over into a hard permanent form, so that a dense sponge-like structure results. The active material therefore is not entirely surrounded by the binding skeleton but is in conducting communication with the lead grid and electrolyte.

Having described my invention, what I claim is:—

1. In electric batteries, a battery electrode containing a porous framework of phenolic condensation product and active material in the pores of the framework.

2. In electric batteries, a storage battery grid, a porous phenolic condensation filling in said grid, and active material in the pores of said filling.

In testimony whereof, I hereunto affix my signature.

THOMAS SPENCER.